United States Patent
Barron et al.

(10) Patent No.: US 6,850,059 B2
(45) Date of Patent: Feb. 1, 2005

(54) VIBRATION DAMPING FEATURE FOR A SENSOR ASSEMBLY

(75) Inventors: Luis F. Barron, El Paso, TX (US); Samuel Roland Palfenier, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/453,101

(22) Filed: Jun. 3, 2003

(65) Prior Publication Data

US 2004/0246685 A1 Dec. 9, 2004

(51) Int. Cl.$^7$ ................................. G01R 33/00
(52) U.S. Cl. .................. 324/262; 361/800; 361/797; 361/752; 324/173; 324/174; 336/192; 336/194
(58) Field of Search .................. 361/800, 752, 361/797; 439/889, 382, 868, 358; 324/173–174, 207.2–205, 262, 207.5; 336/192, 194

(56) References Cited

U.S. PATENT DOCUMENTS

| | | | | |
|---|---|---|---|---|
| 5,520,548 A | * | 5/1996 | Hotea et al. ............... 439/358 |
| 5,613,867 A | * | 3/1997 | Hotea ......................... 439/271 |
| 5,744,951 A | * | 4/1998 | Babin et al. ............... 324/173 |
| 6,305,222 B1 | | 10/2001 | Johnson et al. |
| 6,319,078 B1 | * | 11/2001 | Thorner ..................... 439/883 |
| 6,454,303 B2 | | 9/2002 | Ashtiani et al. |
| 6,508,480 B2 | | 1/2003 | Smith, Jr. et al. |
| 6,547,043 B2 | | 4/2003 | Card |

* cited by examiner

Primary Examiner—Randy W. Gibson
Assistant Examiner—Hung S. Bui
(74) Attorney, Agent, or Firm—Jimmy L. Funke

(57) ABSTRACT

A vibration damping feature for a sensor assembly, particularly a variable reluctance position sensor including a spool assembly, a harness assembly mechanically and electrically joined to the spool assembly, and a cap which sealingly encloses the spool and harness assemblies. The vibration damping feature preferably is in the form of a plurality of crush ribs provided on the periphery of an upper disk of the spool assembly adjacent the joints. The crush ribs contactingly abut the cap sidewall so as to positively locate, in a fixed relationship, the spool assembly relative to the cap adjacent the joints.

16 Claims, 3 Drawing Sheets

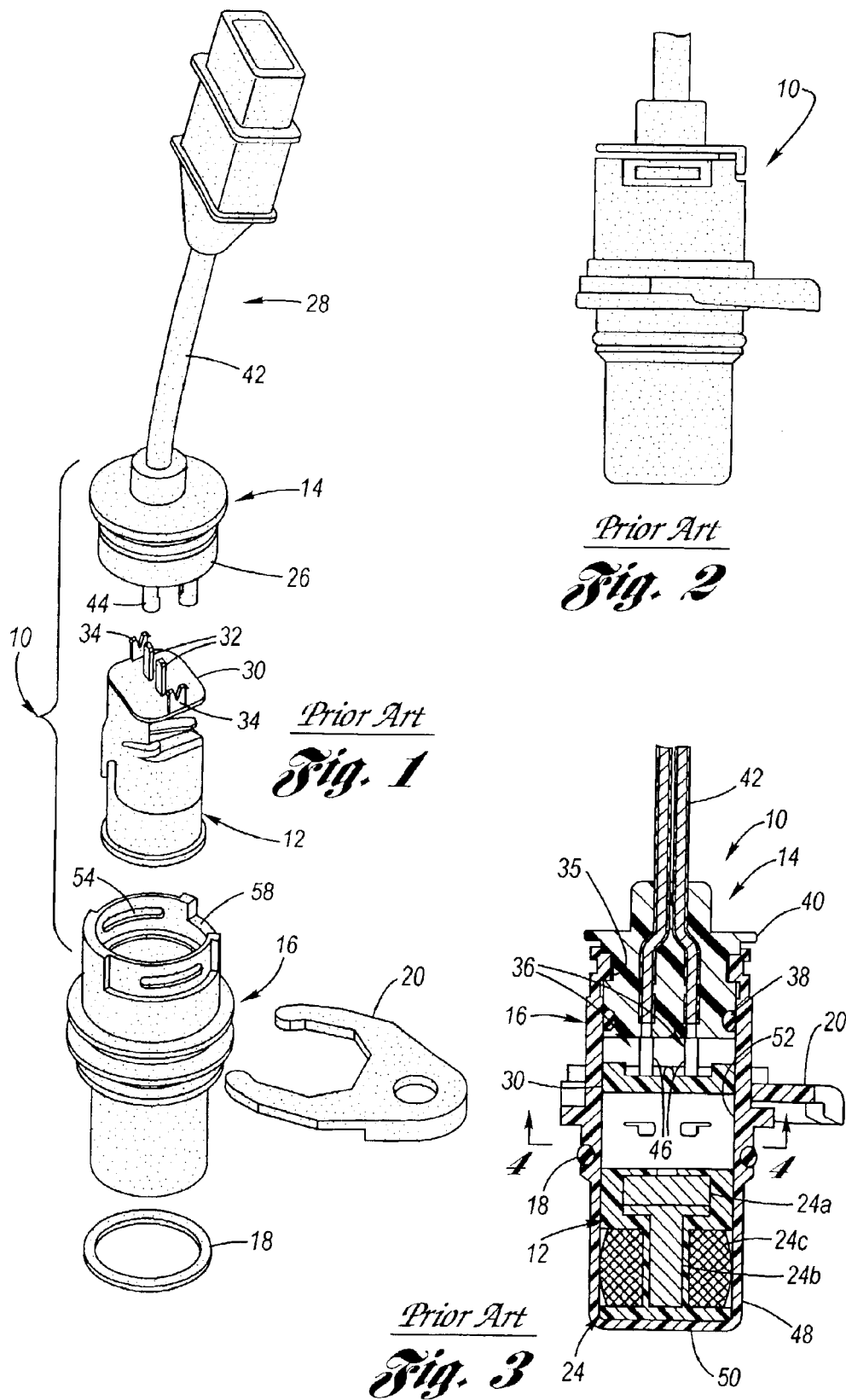

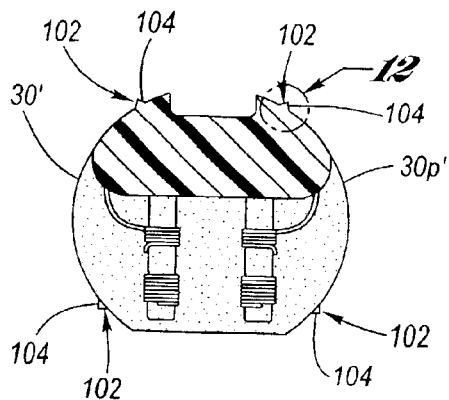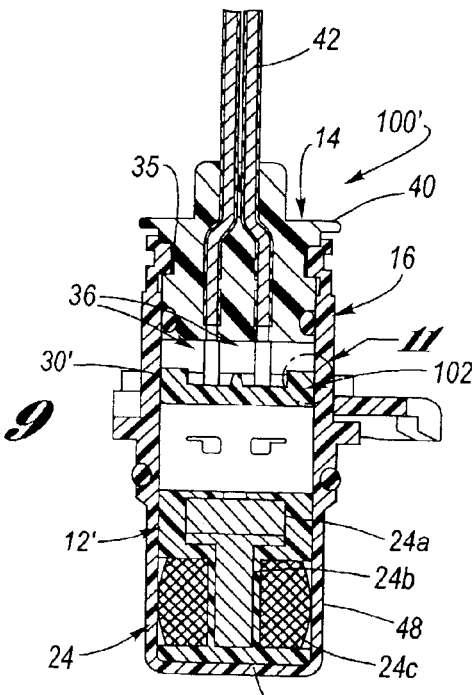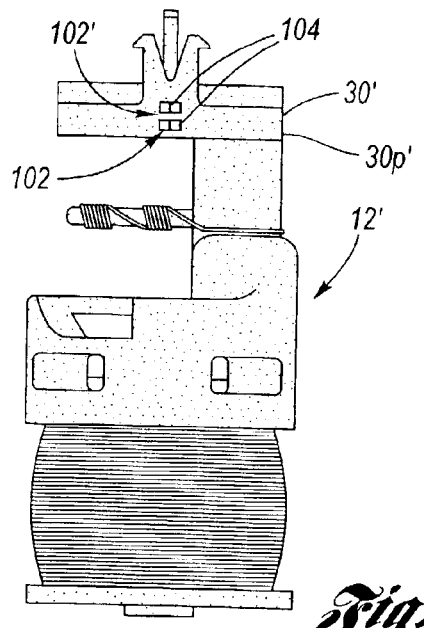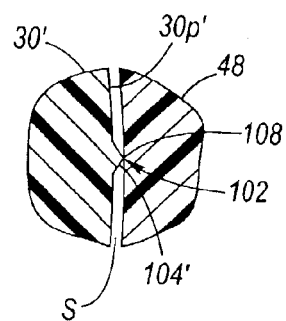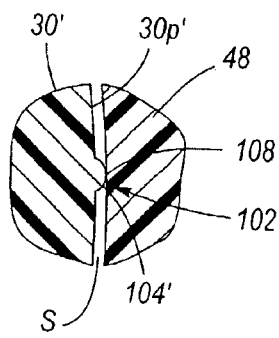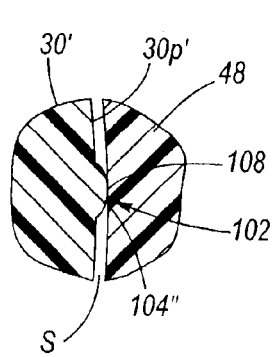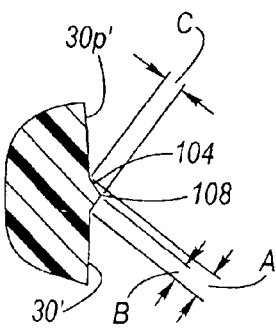

VIBRATION DAMPING FEATURE FOR A SENSOR ASSEMBLY

TECHNICAL FIELD

The present invention relates to sensor assemblies including a cap enclosing a spool assembly and a harness assembly, and more particularly to a vibration damping feature of the spool assembly with respect to the cap.

BACKGROUND OF THE INVENTION

FIGS. 1 through 5 depict a prior art variable reluctance position sensor 10, having three major components: a spool assembly 12, a harness assembly 14, and a cap 16 which scalingly encloses the spool and harness assemblies. Additionally, an O-ring 18 and a bracket 20 provide an installation interface for the cap 16.

The spool assembly 12 includes a reluctance sensor 24 including a magnet 24a, a (low carbon steel) pole piece 24b and a magnet wire coil 24c wrapped around the pole piece. The reluctance sensor 24 senses magnetic field variation due to movement of an adjacent ferromagnetic article, as for example rotational motion of a toothed target wheel. The harness assembly 14 includes a harness body 26 connected with a wiring harness 28 which provides remote connection to an external circuit. The spool assembly 12 further includes an upper disk 30 which supports a pair of spool electrodes 32, as well as a pair of peripherally disposed and diametrically arranged engagement barbs 34.

The harness body 26 has an annular recess which carries a resilient annular seal 38. At the upper end of the harness body is an overhanging annular lip 40 out of the center of which projects, in sealing relation, wiring 42 of the wiring harness 28. At the lower end of the harness body 26 are a pair peripherally disposed, and diametrically arranged, engagement clips 44 (only one being visible in the views). Also at the lower end of the harness body 26 are located a pair of harness electrodes 46 which are electrically connected with the wiring harness 28.

The cap 16 has a cup-shaped sidewall 48, including a bottom 50. The sidewall 48 defines a cavity 52 which communicates with an opening 54.

The spool assembly 12 is mated to the harness assembly 14 by the engagement barbs 34 being mechanically snapped into the engagement clips 44. When so mechanically joined, each spool electrode adjoins a respective harness electrode to thereby provide a pair of adjoined electrode pairs 36. Now each adjoined electrode pair is resistance welded together to provide a good electrical connection therebetween so as to provide a second mechanical joinder between the spool and harness assemblies.

The spool and harness assemblies 12, 14 are then received into the cavity 52 through the opening 54, the spool assembly being first inserted. When the spool assembly bottoms out at the bottom 50 of the cap 16, insertion is complete, wherein the annular seal 38 seals with respect to the sidewall 48 and the annular lip 40 protectively encircles the opening 54. Next, the sidewall 48 is locally heated using a shaped blade and pushed into a couple of grooves located on the harness assembly in order to stake 35 the harness assembly to the cap. Additionally, the harness assembly 16 has a nib 56 protruding from its side which fits into a square cut-out 58 located on the top edge of the cap, wherein the fitting of the nib into the cut-out serves as the anti-rotation feature of the harness assembly relative to the cap.

This type of sensor produces an analog output. The magnitude of the output is directly proportional to the number of turns of wire that make up the coil multiplied by the change in magnetic flux per unit time. The change in magnetic flux per unit time is a function of the target wheel speed. The faster the target rotates the larger the amplitude of the output voltage. If a large output is required at a low target speed the output amplitude is increased by increasing the number of turns of wire in the coil. Variable reluctance position sensors have many uses, for example to detect the speed of rotating shafts in automotive applications.

In operation, although the spool and harness assemblies 12, 14 are mechanically joined, firstly at the clips/barbs 44, 34 and secondly at the electrode pairs 36, and although the harness assembly is staked 35 to the cap 16 and the spool assembly bottomed out on the bottom 50 of the cap, there yet remains a problem associated with vibration fatigue occasioned by a lack of affixment of the spool assembly relative to the cap adjacent the upper disk 30. In this regard, the staking and bottoming out will eliminate motion between the components in the axial direction, but since a separation clearance S (see FIG. 4) must exist between the spool and harness assembly vis-a-vis the inside surface of the sidewall 48 of the cap (for assembly purposes), vibration of the sensor 10 can cause the spool assembly to move radially within the limits of the separation clearance at the periphery 30p of the upper disk 30 with respect to the with the cap. This vibration induced radial movements results in stress at the mechanical joints (electrical and mechanical) between the terminal pairs 36, possibly over time leading to a failure. In this regard, this stress will be greater for (axially) longer spool assemblies.

Accordingly, what is needed in the art is to somehow reduce the stress the mechanical joints experience in a variable reluctance rotary position sensor.

SUMMARY OF THE INVENTION

The present invention is a vibration damping feature for a sensor assembly, particularly a variable reluctance position sensor.

A variable reluctance position sensor according to the present invention includes a spool assembly, a harness assembly, and a cap which sealingly encloses the spool and harness assemblies. The harness assembly is mechanically joined to the spool assembly and is staked to the cap sidewall. A plurality of crush ribs are provided on the periphery of an upper disk of the spool assembly adjacent the mechanical joints. The crush ribs provide vibration damping of the spool assembly adjacent the mechanical joints by contactingly abutting the cap sidewall so as to positively locate, in a fixed relationship, the spool assembly relative to the cap adjacent the electrical and mechanical joints. It is preferred for the crush ribs to be generally uniformly spaced around the periphery of the upper disk, and number at least three. While equal spacing of the crush ribs around the periphery is optimal, other spacing schemes are possible to achieve the same objective. Also, there may be more than one crush rib at each crush rib location. In the preferred embodiment, each crush rib has a triangular shape, however other shapes may be used, such as for example a semi-circle or a bi-sected ellipse in which the apex thereof (farthest portion away from the periphery) abuts the cap sidewall. It will be appreciated that the periphery of the upper disk other than at the crush ribs retains an amount of separation clearance relative to the sidewall consistent with ease of assembly.

Accordingly, it is an object of the present invention to provide a vibration damping feature for the spool assembly of a variable reluctance position sensor.

This and additional objects, features and advantages of the present invention will become clearer from the following specification of a preferred embodiment.

BRIEF DESCRIPTION OF THE DRAWINGS

FIG. 1 is an exploded view of the components of a prior art variable reluctance position sensor.

FIG. 2 is a side elevational view of an assembled prior art variable reluctance position sensor.

FIG. 3 is a sectional view of the prior art variable reluctance position sensor.

FIG. 8 is a partly sectional view of the spool assembly of a variable reluctance position sensor according to the present invention, showing crush ribs at the upper disk thereof.

FIG. 9 is sectional side view of the variable reluctance position sensor according to the present invention.

FIG. 10 is a partly sectional view of the spool assembly of a variable reluctance position sensor according to the present invention, showing a crush rib location having at least two crush ribs at the upper disk thereof.

FIGS. 11, 11A and 11B are detail sectional views of crush ribs having predetermined shapes according to the present invention, shown in an operational environment as seen at circle 11 of FIG. 9.

FIG. 12 is a detail sectional view of a crush rib according to the present invention, seen at circle 12 of FIG. 8.

DESCRIPTION OF THE PREFERRED EMBODIMENT

Figure 4:
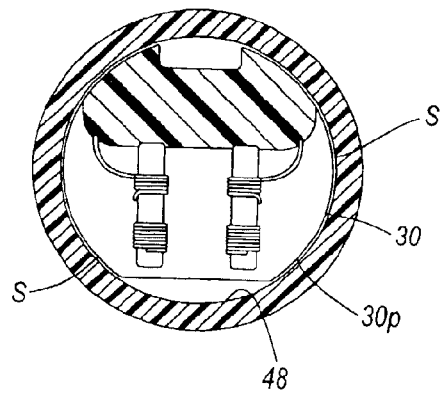
FIG. 4 is a partly sectional view of the spool assembly of the prior art variable reluctance position sensor, seen along line 4—4 of FIG. 3.
Figure 5:
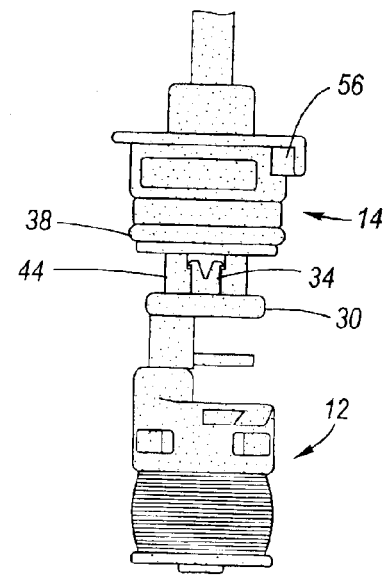
FIG. 5 is a side elevational view of mechanically joined harness and spool assemblies of the prior art variable reluctance rotary position sensor.

Referring now to the Drawing, FIGS. 6 through 10 depict an example of a sensor assembly 100 in form of a variable reluctance position sensor 100' including a vibration damping feature 102 according to the present invention.

The variable reluctance position sensor 100' is generally identical to the variable reluctance position sensor 10 described hereinabove, with the exception that now the vibration damping feature 102 is added to the upper disk 30'. Therefore, for the sake of brevity, the following numeral designation scheme shall be used for FIGS. 6 through 12: parts identical to those of FIGS. 1 through 5 will be identically numbered in FIGS. 6 through 12, modified parts will be designated by the same numeral but with a prime, and newly introduced structures will be newly numbered. Also for the sake of brevity, the parts description with regard to FIGS. 1 through 5 is identically applicable to FIGS. 6 through 12, except where indicated hereinbelow.

Figure 6:
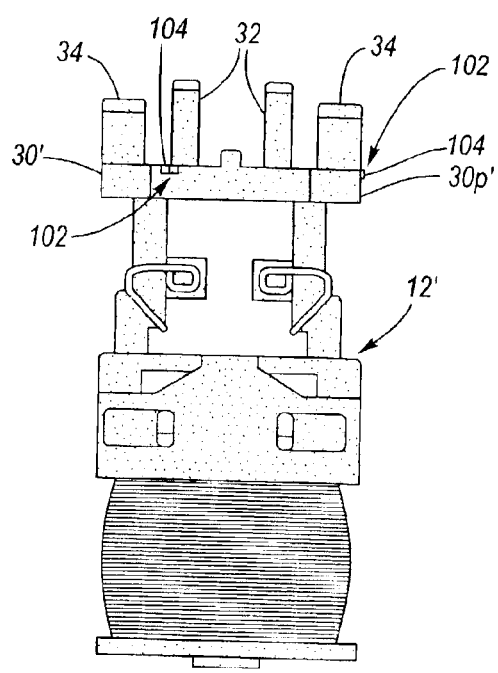
FIG. 6 is a front view of a spool assembly of a variable reluctance position sensor according to the present invention.
Figure 7:
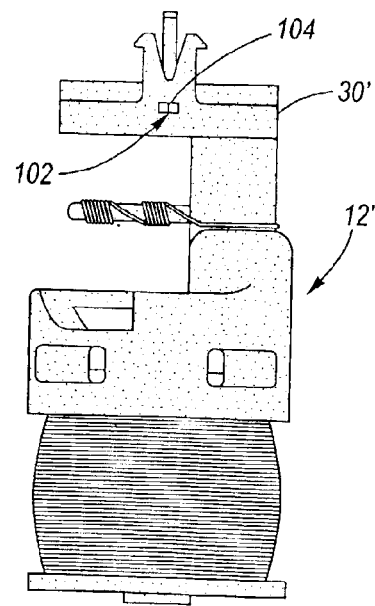
FIG. 7 is a side view of the spool assembly of the variable reluctance position sensor according to the present invention.

As shown at FIGS. 6 through 8, the preferred embodiment of the vibration damping feature 102 is in the form of a plurality of crush ribs 104 located at the periphery 30p' of the upper disk 30' of the spool assembly 12'. The purpose of the crush ribs 104 is to serve as local spacers which abut the sidewall 48 of the cap 16 so as to stationarily position the spool 12' relative to the cap. Because of the crush ribs are peripherally local (that is, the peripheral extent of the crush ribs 104 is very small in relation to the total periphery 30p'), the vast majority of the periphery 30p' has a separation clearance S with respect to the sidewall sufficient to facilitate placement of the spool assembly into the cap with out undue interference (in contrast, an undue, even inoperable, amount of interference could be expected if the periphery were to be increased in diameter sufficient to abut the sidewall. This aspect of operation can be seen in FIG. 11, where a crush rib 104 provides a separation clearance S between the periphery 30p' of the upper disk 30' and the sidewall 46 of the cap 16. A minimum number of crush ribs is three in order to ensure everywhere around the periphery 30p separation clearance S is provided (four crush ribs 104 are shown merely by way of exemplification). While equal spacing of the crush ribs around the periphery is optimal but other spacing schemes are possible to achieve same objective. Also, there may be more than one crush rib 104 at each crush rib location 102' of the vibration damping feature 102, as for example shown at FIG. 10.

As shown at FIG. 11, the crush rubs 104 are preferably in the shape of triangular points radially projecting outwardly from the periphery 30p. The apex 108 is pointed, wherein the apex may be crushed against the sidewall 46 during installation. While in the preferred embodiment each crush rib 104 has a triangular shape, other shapes may be used, such as for example a semi-circle 104' or a bi-sected ellipse 104", as shown at FIGS. 11A and 11B, in any of which the apex 108 thereof (which is the farthest portion away from the periphery) abuts the cap sidewall. In this regard, the spacing provided by the apex 108 of all the crush ribs 104 may overlap the sidewall 46, wherein during installation, the apex is crushed compliantly such as to stationarily affix the position of the upper disk relative to the sidewall.

FIG. 12 is a detail view of a crush rib 104. By way merely of exemplification, the dimension A of the crush rib 104 may be 0.25 mm, the dimension B may be 0.39 mm and the dimension C may be 0.31 mm. It is to be noted that other dimensions are possible for the crush ribs, which further, may shaped other than triangular, as noted above.

In operation, the spool and harness assemblies 12, 14 are electrically and mechanically joined and then received into the cap 16 through the opening 54, spool assembly first. When the spool assembly bottoms out at the bottom 50 of the cap, the crush ribs 104 are in a firmly abutting relation with respect to the sidewall 48, and the annular seal 38 is in a sealing relation with respect to the sidewall. Thereafter, the sidewall 48 is locally heated using a shaped blade and pushed into a couple of grooves located on the harness assembly in order to stake 35 the harness assembly to the cap.

Now in addition to the staking and bottoming out eliminating motion between the components in the axial direction, the crush ribs 104 provide a stationary affixment of the spool at the upper disk 30' vis-a-vis the inside surface of the sidewall of the cap, such that vibration of the sensor 100 cannot cause the spool assembly to move radially inside the cap, thereby eliminating stress in the electrical and mechanical joints between the spool and harness terminals.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. In a sensor assembly comprising a spool assembly, a harness assembly mechanically and electrically joined to said spool assembly, and a cap having a sidewall defining a cavity receiving thereinside said spool and harness assemblies; an improvement thereto comprising:

a vibration damping feature locating said spool assembly in radially stationary relation relative to said sidewall, said vibration damping feature being located adjacent the mechanical and electrical joinder of said spool and harness assemblies.

2. The sensor assembly of claim 1, wherein said spool assembly has an upper disk, the upper disk having a periphery; said vibration damping feature being integrally connected with said upper disk at said periphery thereof;

wherein said vibration damping feature provides a predetermined separation clearance between said periphery and said sidewall.

3. The sensor assembly of claim 2, wherein said vibration damping feature comprises:

a plurality of crush ribs located at said periphery in a predetermined mutually spaced apart relation therearound.

4. The sensor assembly of claim 3, wherein said predetermined mutually spaced apart relation comprises a mutually equal spacing apart.

5. The sensor assembly of claim 3, wherein said plurality of crush ribs comprise at least three crush rib locations of said periphery.

6. The sensor of claim 5, wherein each rib location of said plurality of rib locations has at least two said crush ribs thereat.

7. The sensor assembly of claim 5, wherein each crush rib of said plurality of crush ribs comprises a predetermined shape having an apex, wherein the apex abuts said sidewall.

8. The sensor assembly of claim 7, wherein the respective apex of each said crush rib collectively define a perimeter larger than a diameter of said sidewall, and wherein the apices crush against the sidewall to thereby define the separation clearance when said spool assembly is located within said cavity.

9. A variable reluctance position sensor comprising:

a spool assembly having a reluctance sensor;

a harness assembly mechanically and electrically joined to said spool assembly;

a cap having a sidewall defining a cavity receiving thereinside said spool and harness assemblies; and a vibration damping feature locating said spool assembly in radially stationary relation relative to said sidewall, said vibration damping feature being located adjacent the mechanical and electrical joinder of said spool and harness assemblies.

10. The sensor of claim 9, wherein said spool assembly has an upper disk, the upper disk having a periphery; said vibration damping feature being integrally connected with said upper disk at said periphery thereof;

wherein said vibration damping feature provides a predetermined separation clearance between said periphery and said sidewall.

11. The sensor of claim 10, wherein said vibration damping feature comprises:

a plurality of crush ribs located at said periphery in a predetermined mutually spaced apart relation therearound.

12. The sensor assembly of claim 11, wherein said predetermined mutually spaced apart relation comprises a mutually equal spacing apart.

13. The sensor assembly of claim 11, wherein said plurality of crush ribs comprise at least three crush rib locations of said periphery.

14. The sensor of claim 13, wherein each rib location of said plurality of rib locations has at least two said crush ribs thereat.

15. The sensor assembly of claim 13, wherein each crush rib of said plurality of crush ribs comprises a predetermined shape having an apex, wherein the apex abuts said sidewall.

16. The sensor of claim 15, wherein the respective apex of each said crush rib collectively define a perimeter larger than a diameter of said sidewall, and wherein the apices crush against the sidewall to thereby define the separation clearance when said spool assembly is located within said cavity.

* * * * *